US012111739B1

(12) United States Patent
Mantrala et al.

(10) Patent No.: US 12,111,739 B1
(45) Date of Patent: Oct. 8, 2024

(54) DATA CACHING IN RESERVED STORAGE CAPACITY OF CLOUD PROVIDER NETWORK EXTENSIONS

(71) Applicant: Amazon Technologies, Inc., Seattle, WA (US)

(72) Inventors: Ravi Mantrala, Bothell, WA (US); Peng Wu, Westborough, MA (US); Danny Wei, Seattle, WA (US); Shailesh Bhagwat, Southborough, MA (US); Sandeep Kumar, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 17/937,361

(22) Filed: Sep. 30, 2022

(51) Int. Cl.
*G06F 11/20* (2006.01)
*G06F 9/50* (2006.01)
*G06F 11/07* (2006.01)

(52) U.S. Cl.
CPC ........ *G06F 11/2025* (2013.01); *G06F 9/5044* (2013.01); *G06F 9/5077* (2013.01); *G06F 11/0772* (2013.01)

(58) Field of Classification Search
CPC .................................................. G06F 11/2025
USPC .......................................................... 714/6.3
See application file for complete search history.

(56) References Cited

U.S. PATENT DOCUMENTS

2020/0409600 A1\* 12/2020 Liguori ................. G06F 3/0671
2021/0168203 A1\* 6/2021 Parulkar ................. H04L 67/60
2021/0194825 A1\* 6/2021 Goodman ............... G06F 16/29

\* cited by examiner

*Primary Examiner* — Chae M Ko
(74) *Attorney, Agent, or Firm* — Knobbe, Martens, Olson & Bear, LLP

(57) ABSTRACT

Systems and methods are described for use of reserved storage capacity at a cloud provider network extension, sometimes referred to as a provider substrate extension ("PSE") or "outpost", as a data cache, thereby improving performance of the PSE. The reserved storage capacity may be reserved for a primary purpose, such as data replication in the event of failure of an in-use portion of the PSE's storage capacity. During non-failover operation, the reserved storage capacity may be otherwise unused. Embodiments of the present disclosure enable the reserved storage capacity, when not used for its primary purpose, to be used as a data cache to store information potentially used at the PSE.

19 Claims, 6 Drawing Sheets

DATA CACHING IN RESERVED STORAGE CAPACITY OF CLOUD PROVIDER NETWORK EXTENSIONS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

Figure 1:
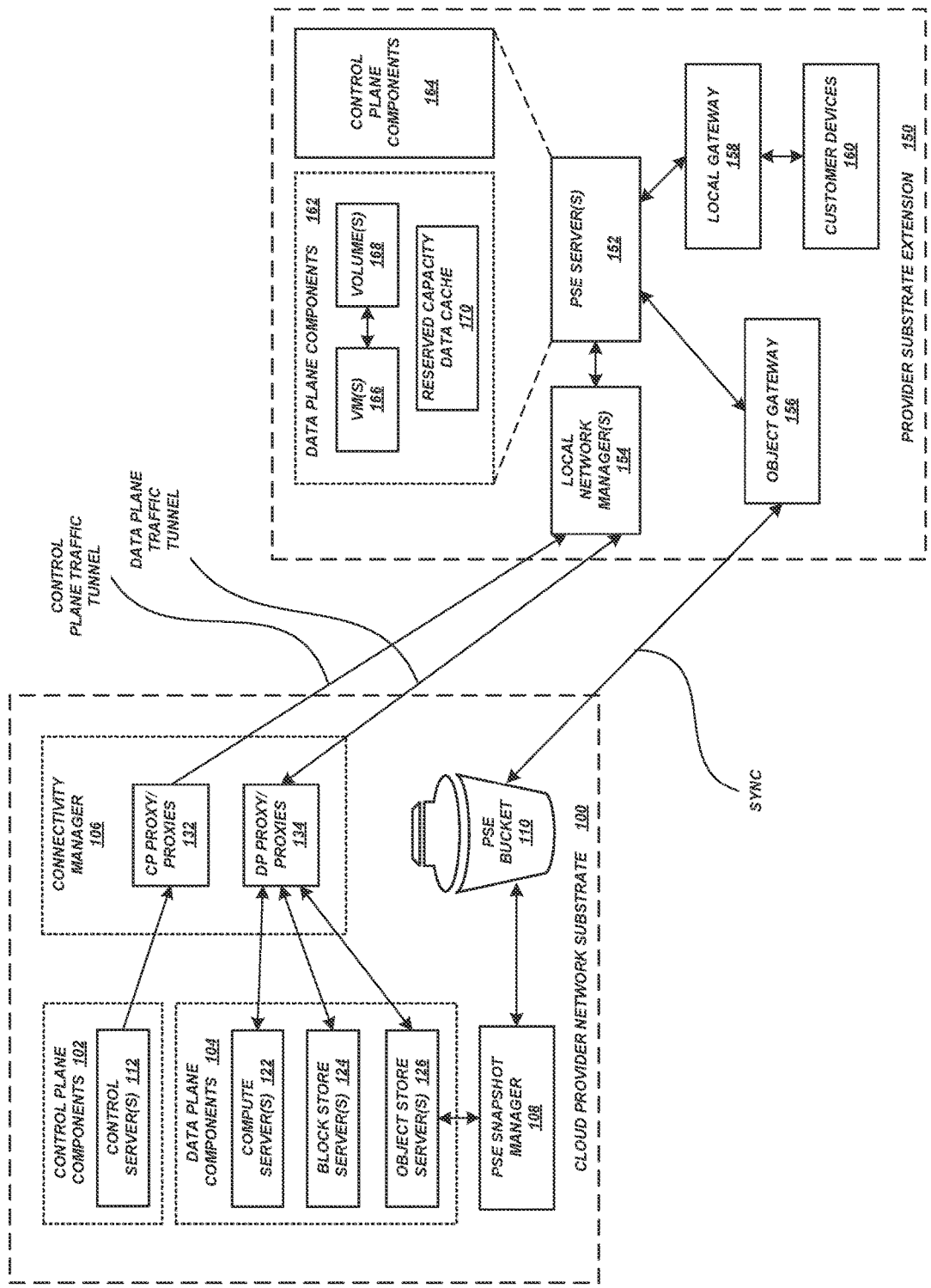
FIG. 1 is a block diagram of an example cloud provider network extended by a provider substrate extension located within a network external to the cloud provider network according to some embodiments.

Generally described, aspects of the present disclosure relate to efficient usage of reserved storage capacity at a cloud provider network extension, sometimes referred to as a provider substrate extension ("PSE") or "outpost". A PSE is generally physically external to and separate from a cloud provider network, and facilitates interaction with the cloud provider network. For example, the PSE may be a collection of hardware physically located within an end user data center and fully managed by the cloud provider. Alternatively, the PSE may be implemented as software executed on end-user-managed hardware. The PSE may provide a variety of functions similar or identical to those provided by a cloud provider network (such as hosting virtual compute capacity, block storage, object storage, etc.) with advantages related to local implementation of such functions, such as lower latency for an end user, decreased risk of interference due to intermediary network failure, or the like. During normal operation, the PSE may programmatically manage such functions via interaction with the cloud provider network, as needed. For example, the PSE may accept local modifications to data and sync such modifications to the cloud provider network as appropriate. In one embodiment, the PSE operates based at least partly on data retrieved from the cloud provider environment. For example, on initialization, a PSE may retrieve required data (such as machine images representing contents of a data store for a virtual machine providing PSE-related functionality) from the cloud provider environment. Because the PSE is remote from the cloud provider environment, and because such data may be of significant size, retrieval of the data may take considerable time and thus delay initialization or full operation of the PSE. Embodiments of the present disclosure address this problem by providing for opportunistic caching of data at a PSE utilizing reserved storage capacity of the PSE.

Specifically, embodiments of the present disclosure can enable a PSE to store potentially needed data—such as machine images—in failover or otherwise reserved persistent storage capacity of the PSE. A PSE may have reserved persistent storage capacity for a variety of reasons. As one example, the PSE may provide persistent storage as a user-facing function, enabling storage for example of data objects on behalf of an end user (e.g., as an extension of cloud-based block storage) and may maintain reserved capacity to ensure resiliency of such storage. Illustratively, a PSE may be configured to ensure that data stored at the PSE is replicated at least a threshold number of times, and may include reserved storage capacity such that the replication number can be maintained in the case of failure. As an example, if a given virtual block storage device is replicated no fewer than two times and a storage device storing one of the two replicas fails, the PSE may create an additional replica within reserved failover capacity to maintain the desired replication level. Under normal operating conditions without failure, this reserved capacity may be unused. Embodiments of the present disclosure therefore relate to utilizing this reserved capacity as a data cache, enabling required (or potentially required data) to be stored in the reserved capacity that is not otherwise required. Embodiments of the present disclosure further provide for management of reserved capacity during failover events, which reserved capacity may be needed for its primary purpose (e.g., replicating other stored data) as well as during scale-up (e.g., a return to normal operation after a failure).

As disclosed herein, a PSE may implement at least some functionality utilizing virtual machine instances. Each virtual machine instance may be initialized on the basis of a machine image reflecting a set of data used to operate the virtual machine instance. Illustratively, the machine image may represent a point-in-time representation, sometimes referred to as a "snapshot" of a persistent data store (e.g., a "hard drive") storing software executable to implement the instance, such as an operating system, applications, end user data, and the like. In some cases, the image may include further information reflecting a state of operation of a virtual machine instance, such as central processing unit (CPU) register states or the like. Machine images may be persistently stored at a cloud provider network. However, the size of a machine image may be large relative to bandwidth between the PSE and the cloud provider network, such that transfer of a machine image takes significant time (e.g., minutes, hours, or longer). Thus, when a machine image is not yet stored locally to a PSE, implementation of a corresponding virtual machine instance may require significant initialization time due to time required to retrieve the machine image from the cloud provider network.

Embodiments of the present disclosure address this problem by providing for storage of machine images (or other data) in failover or other reserved capacity of a PSE. Illustratively, data expected to be used at a PSE can be loaded into reserved capacity of the PSE, such that it is later available locally at the PSE and need not be retrieved from a cloud provider network. In one embodiment, each machine image retrieved from the cloud provider network is stored within reserved capacity of a PSE as part of retrieval. Such retrieval may occur, for example, based on a user request to utilize a machine image (e.g., to create a virtual machine image) or based on other configuration of the PSE (e.g., programmatic configuration to retrieve important images on initialization). The PSE may thereafter implement cache eviction policies to manage data stored within the reserved capacity, such as by deleting a last-used or least-prioritized machine image when unused reserved capacity falls below a threshold level. Accordingly, subsequent use of the machine image can be facilitated via local storage of the PSE, rather than requiring retrieval from the cloud provider network.

In one embodiment, a PSE includes a local network manager that handles requests for machine images and provides the requested machine image from an appropriate location. For example, the manager may determine whether a machine image is stored locally at the PSE, such as in reserved storage capacity, and if so return the image from local storage in response to a request. Alternatively, the manager may retrieve the image from a cloud provider network (operating as an "origin" server) if the image is not local stored. In some embodiments, the PSE may implement "read through" or "cache miss" functionality that provides an appearance that a machine image is locally stored even when it is not. For example, the PSE may accept read requests for a portion of a machine image as if the image were locally stored on the PSE, and if it is not in fact stored, may read the requested portion from the cloud provider network in order to service each request. Thus, the PSE can provide for unified access to an image regardless of the storage location of the image, while providing where possible rapid access on the basis of a data cache within reserved capacity.

The PSE may be further configured to modify a data cache within reserved capacity based on availability of that reserved capacity. Illustratively, during failover operations (such as when a portion of persistent storage fails at a PSE), some or all reserved capacity may be needed for its reservation (e.g., primary) purpose. Accordingly, the size of the reserved capacity may be reduced as that portion of reserved capacity is used for its reservation purpose (such as storing replicas of a cloud-based block storage volume. The PSE can be configured to handle such a reduction in reserved capacity similar to other cache eviction events, such as by remove from the cache a lowest priority data set (e.g., based on least recent use or other criteria). Similarly, where reserved capacity size increases (such as by addition of new storage hardware after a failure), the size of a corresponding data cache can also be increased to facilitate additional cache storage.

As discussed above, use of that reserved storage capacity as a data cache may increase responsiveness of the PSE by correspondingly decreasing time required to retrieve data from a remote location (e.g., a cloud provider network) when such data is requested. Moreover, because reserved capacity may generally be otherwise unused in a PSE, and because the PSE can be configured such that use of reserved capacity as a cache does not impair primary functionality of reserved capacity, these benefits may be effectively cost-free. Accordingly, one of skill in the art will appreciate, in light of the present disclosure, that the embodiments disclosed herein improve the ability of computing systems to provide data when such data is required. These embodiments provide for locally caching of data based on expected future use, thereby avoiding latency and bandwidth use that would otherwise be required to transfer the data from a remote location. Moreover, the presently disclosed embodiments address technical problems inherent within computing systems; specifically, the difficulty of transferring data (and particularly large amounts of data) between distinct computing systems. These technical problems are addressed by the various technical solutions described herein, including the use of reserved capacity on a PSE as a data cache, improving responsiveness of the PSE without detrimentally impacting operation of the PSE and without otherwise increasing the resources required at the PSE. Thus, the present disclosure represents an improvement on PSEs and computing systems in general.

While aspects of the present disclosure are described with respect to machine images, embodiments of the present disclosure may provide for caching of a wide variety of data in addition or alternatively to machine images. For example, embodiments of the present disclosure may provide for caching of data objects stored in a cloud-based object storage system. Thus, description of machine images should be understood to be one illustrative example of data that may be cached in accordance with embodiments of the present disclosure.

Various aspects of the disclosure will now be described with regard to certain examples and embodiments, which are intended to illustrate but not limit the disclosure. Although aspects of some embodiments described in the disclosure will focus, for the purpose of illustration, on particular examples of storage data structures, API calls, and encryption protocols, the examples are illustrative only and are not intended to be limiting. In some embodiments, the techniques described herein may be applied to additional or alternative storage data structures, API calls, encryption protocols, and the like.

With reference to an illustrative embodiment, FIG. 1 shows an example computing environment in which the features of the present disclosure may be implemented. As shown, the computing environment includes a cloud provider network substrate 100 (also referred to herein as a "cloud provider network." "provider network," "cloud provider system", or simply as a "cloud" for convenience) and a provider substrate extension 150 (also referred to herein as a "provider network extension" or simply as a "PSE" for convenience) that is a remote extension of the cloud provider network 100. The cloud provider network 100 and the PSE 150 may communicate with each over via an intermediate network (not shown), such as the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

The control plane components 102 are typically implemented on a separate set of servers from the data plane components 104, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

In some embodiments, a snapshot is a point-in-time block-level backup of a volume, stored as a copy of data on the volume on one or more of the object storage servers 126 (e.g., as a single object or a collection of objects). However, unlike other data stored on the object storage servers 126, snapshots may not be directly accessible within object storage buckets, and instead are accessible through the API of the block store servers 124. In one example, snapshots are implemented as incremental records of data within a volume. Illustratively, when the first snapshot of a volume is taken, all blocks of the volume that contain valid data are copied as one or more objects to the object storage servers 126, and then a snapshot definition or "manifest" file is written to the object storage servers 126 that includes a record of the one or more objects, as well as the blocks of the volume to which each of the one or more objects correspond. Due to the use of incremental snapshots, when the subsequent snapshots are taken of the same volume, only the blocks that have changed since the first snapshot need to be copied to the object storage servers 126, and the manifest can be updated to point to the latest versions of each data block (or a second manifest can be created, enabling the initial manifest to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 126, and new copies of the instance can be launched from the machine image.

Users can instruct the cloud provider network 100 to create snapshots of their volumes on the block store servers 124 and store the snapshots on the object store servers 126. A snapshot can then be used to create a new volume with information matching the volume captured in the snapshot, for example providing the benefit of feeding the volume data to the new copy without impacting I/O operations at other replicas of the volume. Further, due to the greater redundancy of the object store servers 126 provided in some embodiments, such snapshots may provide a more resilient backup copy of a volume than additional copies stored on the block store servers 124. Another benefit of using a snapshot to create a new volume copy is that it may provide the ability to replicate the volume across availability zones, while the block store servers 124 may only support replication within a given availability zone.

The connectivity manager 106 (including control plane proxies 132 and data plane proxies 134), PSE snapshot manager 108, and PSE bucket 110 depicted in the cloud provider network 100 may be provisioned in a particular region or availability zone of the cloud provider network 100 in response to the creation of a substrate extension 150, and are described in further detail below.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as a "provider substrate extension" or PSE 150—to be provisioned within the customer's network. A customer may access their PSE 150 via the cloud provider network 100 or their own network, and may use the same APIs to create and manage resources in the PSE 150 as they would use to create and manage resources in the cloud provider network 100 region.

The PSE 150 may be pre-configured, e.g. by the provider network operator, with the appropriate combination of hardware with software and/or firmware elements to support various types of computing-related resources, and to do so in a manner that mirrors the experience of using the cloud provider network 100. For example, one or more PSE servers 152 can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their PSE 150 as they do in the cloud provider network 100 region, the PSE server 152 can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server 152, meaning while other VMs are still running and consuming other capacity of the PSE server 152. This can improve utilization of resources within the PSE 150 by allowing for better packing of running instances on physical hosts, and also provides a seamless experience regarding instance usage across the cloud provider network 100 region and PSE 150.

As illustrated, the PSE servers 152 can host one or more VMs 166. The customer can use these VMs 166 to host containers, which package up code and all its dependencies so an application can run quickly and reliably from one computing environment to another. In addition, the PSE servers 152 may host one or more data volumes 168, if desired by the customer. In the cloud provider network 100 region, such volumes may be hosted on dedicated block store servers 124. However, due to the possibility of having a significantly smaller capacity in the PSE 150 than in the region, it may not provide an optimal utilization experience if the PSE 150 includes such dedicated block store servers. Accordingly, the block storage service may be virtualized in the PSE 150, such that one of the VMs runs the block store software and stores the data of the volume. Similar to the operation of the block storage service in the region, the volumes within a PSE 150 may be replicated for durability and availability. The volumes may be provisioned within their own VPC within the PSE 150. The VMs 166 and any volumes 168 collectively make up the data plane components 162 within the PSE 150 that are an extension of the provider network data plane 162.

The PSE servers 152 may, in some implementations, host certain local control plane components 164, for example components that enable the PSE 150 to continue functioning if there is a break in the connection back to the cloud provider network 100 region. Examples of these components include a migration manager that can move VMs between PSE servers if needed to maintain availability, a key value data store that indicates where volume replicas are located, and a local VM placement component that can respond to requests for new VMs made via the customer network. However, generally the control plane for the PSE 150 will remain in the cloud provider network 100 region, in order to allow the customer to use as much capacity of the PSE 150 as possible. At least some VMs 166 that are set up at the PSE 150, and associated higher-level services that use such VMs 166 as building blocks, may continue to function even during periods of time when connectivity to the provider network data centers is temporarily disrupted in some embodiments.

Server software may be designed by the cloud provider to run on the cloud provider network 100, and this software may be enabled to run unmodified in a PSE 150 by using the local network manager(s) 154 to create a private replica of the cloud provider network 100 within the PSE 150 (the "shadow substrate"). The local network manager(s) 154 can run on PSE 152 servers and bridge the shadow substrate with the customer's on-premise network, for example by acting as a VPN endpoint between the PSE 150 and the proxies 132, 134 provisioned in the cloud provider network 100, and by implementing the mapping service (for traffic encapsulation and decapsulation) to relate data plane traffic (from the DP proxies 134) and control plane traffic (from the CP proxies 132) to the appropriate droplet. By implementing a local version of the provider network's substrate-overlay mapping service, resources in the PSE 150 can seamlessly communicate with resources in the cloud provider network 100 region. In multi-rack PSEs 150, inter-rack communications can go through the local network managers 154, with local network managers 154 maintaining open tunnels to one another. The local network managers 154 may be collocated on the PSE servers 152, may run on a separate card of the PSE server 152 (e.g., an offload card), or can be installed as their own servers separate from the compute hosts. In some implementations, a single local network manager 154 can perform these actions for all hosts in the PSE 150. In other implementations, each host in the PSE 150 may have a dedicated local network manager 154.

PSEs 150 can require secure networking tunnels from the customer network to the cloud provider network 100 in order to operate, for example to maintain security of customer data when traversing an intermediate network, which may be the Internet. These tunnels are composed of virtual infrastructure components including VPCs, CP proxies 132 and DP proxies 134 (which may be implemented as containers running on compute instances), and substrate network interfaces. Every host in a PSE 150 can require at least two tunnels, one for CoAP control plane traffic and one for encapsulated data plane traffic. The connectivity manager 106 manages the cloud provider network 100 region-side lifecycle of these tunnels and their components, for example provisioning them automatically when needed and maintaining them in a healthy operating state.

A control plane (CP) proxy 132 can be provisioned in the cloud provider network 100 to represent particular host(s) in the PSE 150. A CP proxy 132 is an intermediary between the substrate in the cloud provider datacenter and the shadow substrate in the PSE 150. The CP proxy 132 maintains a VPN tunnel to a local network manager 154 in the PSE 150. CP proxies 132 can be implemented as compute instances that have a network interface in the substrate and an additional network interface in a VPC. CP proxies 132 can implement VPN tunnels back to the cloud provider network 100 region, instance traffic NATing to/from customer networks, and participate in the CoAP proxy path. CP proxies 132 provide infrastructure for tunneling management API traffic destined for PSE hosts out of the region substrate and to the remote PSE location. The software implemented within the CP proxies 132 ensures that only well-formed API traffic leaves from and returns to the substrate. CP proxies 132 provide a mechanism to expose remote devices (within a PSE 150 in a customer facility) on the cloud provider substrate, while still protecting substrate security materials (e.g., GIS keys, GTS tokens) from leaving cloud provider datacenters. The one way control plane traffic tunnel imposed by the CP proxies also importantly prevents any (potentially compromised) devices from making calls back to the substrate. CP proxies 132 may be instantiated one-for-one with PSE servers 152, or may be able to manage control plane traffic for multiple PSE servers 152 in the same PSE 150.

A data plane (DP) proxy 134 can also be provisioned in the cloud provider network 100 to represent particular host(s) in the PSE 150. The DP proxy 134 acts as a shadow or anchor of the host, and can be used by services within the cloud provider network 100 to monitor health of the host (including its availability, used/free compute and capacity, used/free storage and capacity, and network bandwidth usage/availability). The DP proxy 134 also allows VPCs to span PSEs and a public region of the cloud provider network 100, by acting as a proxy for the PSE server 152 in the cloud provider network 100 region. Each DP proxy 134 can be implemented as a packet-forwarding compute instance or container. As illustrated, each DP proxy 134 can maintain a VPN tunnel with the local network manager 154 that manages the PSE server 152 that the DP proxy 134 represents. This tunnel can be used to send data plane traffic between the PSE 150 and the cloud provider network 100 region. Data plane traffic flowing between the PSE 150 and the cloud provider substrate can be passed through DP proxies 134 associated with that PSE 150. For data plane traffic flowing from the PSE 150 to the cloud provider substrate, DP proxies 134 can receive encapsulated data plane traffic, validate it for correctness, and allow it to enter into the substrate network. DP proxies 134 can forward encapsulated traffic from the cloud provider substrate directly to the PSE 150. If a DP proxy 134 receives any control plane traffic from the PSE 150, it will drop the traffic so that it does not enter the substrate. Regarding control plane traffic flowing from the region to the PSE 150, DP proxies 134 can delegate non-encapsulated traffic (e.g., control plane traffic) to the appropriate CP proxy 132 based on substrate IP address. Beneficially, this enforces the one-way secure tunnel between the CP proxies 132 and the local network manager 154 for control plane traffic, protecting the cloud provider network 100 against any potentially malicious control traffic flowing in from a PSE 150, but still allowing the customer to send control signals into the PSE 150 via the cloud provider substrate (e.g., to provision VMs 166 in the PSE 150, create volumes 168 in the PSE 150, attach these VMs 166 to these volumes 168, to deprovision any resources in the PSE 150, and to configure networking for PSE resources).

In at least some embodiments, a local network manager 154 may initiate the automated establishment of (or at least participate in the automated establishment of) secure network connectivity with the proxies 132, 134 established at one or more provider network data centers. After connectivity has been established between the local network manager 154 and the proxies 132, 134 at the provider network data center(s), the customer may issue commands to instantiate virtual machines (and/or perform other operations using virtual machines) that use PSE resources, in a manner analogous to the way in which such commands would be issued with respect to virtual machines that use only provider network resources. From the perspective of the customer, the functionality of the cloud provider network 100 may now seamlessly be utilized using local resources within the PSE 150 (as well as resources located in the provider network data centers, if desired). The VMs 166 set up on a PSE server 152 at the provider substrate extension 150 may communicate (e.g., with the help of the network manager 154, which may perform address translation and/or other encapsulation protocol-related processing) both with customer devices 160 located on the customer's computing network in various embodiments, as well as with other VMs that are set up in the provider network data centers, as desired.

A local gateway 158 can be implemented to provide network connectivity between resources running on the PSE servers 152 and customer devices 160 on the customer's network, in order to take advantage of the reduced latency and other benefits of having cloud provider hardware installed in the customer network. The customer can configure the local gateway 158 by issuing API calls to an interface of the cloud provider network 100 which results in control plane commands being sent to the PSE 150. The customer can establish communications between instances hosted by the PSE 150 and the customer devices 160 via the local gateway 158. The local customer devices 160 can include any on-premise or mobile devices that have access to the customer network, for example robotic devices, manufacturing devices, medical equipment, mobile phones, or other computing devices on the customer network.

There may be circumstances that necessitate the transfer of data between the object storage service in the cloud provider network 100 and the PSE 150. For example, the object storage service may store machine images used to launch VMs 166, as well as snapshots representing point-in-time backups of volumes 168. The object gateway 156 can be a provider on a PSE server 152 or a specialized storage device, and provides customers with configurable, per-bucket caching of object storage bucket contents in their PSE 150 to minimize the impact of PSE-region latency on the customer's workloads. The object gateway 156 can also temporarily store snapshot data from snapshots of volumes in the PSE 150 and then sync with the object store servers 126 in the region when possible. The object gateway 156 can also store machine images that the customer designates for use within the PSE 150 or on the customer's premises. While shown in FIG. 1 as distinct from local network managers 154, in some embodiments functionality of the object gateway 156 may be implemented by local network managers 154. Moreover, while shown as distinct from PSE servers 152, in some instances either or both the object gateway 156 and the local network managers 154 are implemented by the PSE servers 152.

In the manner described above, the PSE 150 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In some implementations, the data within the PSE 150 may be encrypted with a unique key, and the cloud provider network 100 can limit keys from being shared from the region to the PSE 150 for security reasons. Accordingly, data exchanged between the object store servers 126 and the PSE 150 (e.g., via the object gateway 156 and/or a virtualized block storage service on a PSE server 152 without necessarily using an object gateway 156) may require encryption, decryption, and/or re-encryption in order to preserve security boundaries with respect to encryption keys. The PSE snapshot manager 108 can perform these operations, and a PSE bucket 110 can be created (on the object store servers) to store snapshot and machine image data using the PSE encryption key. In some embodiments, there may be a separate PSE bucket 110 for each separate PSE 150.

As discussed above, embodiments of the present disclosure can provide for improved operation of a PSE 150 by utilizing reserved storage capacity of the PSE 150 to implement a reserved capacity data cache 170. The reserved capacity data cache 170 is illustratively implemented using excess storage capacity of the PSE servers 152, which excess capacity is reserved for another use. For example, the cache 170 may be implemented on storage capacity reserved for failover in the case of failure of hardware supporting storage of volumes 168. Illustratively, PSE servers 152 may include physical hardware supporting persistent data storage, such as solid state drives (SSDs), hard disk drives (HDDs), or the like. Some portion of the storage provided by this hardware may be used to support operations of the PSE servers 152, such as storage of data corresponding to VMs 166, storage of volumes 168, storage of data used to implement control plane components 164, etc. Another portion of this storage may be reserved for failover operation, such that if all or a portion of the data supporting present operations of the PSE servers 152 is lost or inaccessible (e.g., due to hardware failure, corruption, etc.), the reserved portion of storage hardware can be utilized to maintain operation of the PSE servers 152. As one illustration, each volume 168 may be implemented at a PSE server 152 as multiple replicas, with each replica representing an entire copy of the data of the volume 168. This replication can ensure resiliency of the data, as the data would be expected to remain accessible so long as a single replica remains accessible. Reserved storage capacity can illustratively be used to maintain a desired number of replicas (a "replication level"). For example, if one replica fails, a new replica may be created within reserved capacity, and data from a non-failed replica may be copied to the new replica such that the total replication level is not changed. The size of reserved capacity can be significantly larger than the size of data supporting operation of the PSE servers 152. For example, machine images reflecting an initial state for volumes 168 or VMs 166 may represent a few gigabytes of data (e.g., 1-25 gigabytes), while reserved capacity represents many multiples of this value, such as multiple terabytes. The size of reserved capacity may be selected to provide for very high levels of resiliency (e.g., operation even when nearly all storage hardware of the PSE 150 fails). As a result, the reserved capacity may be generally unused for its primary purpose (e.g., failover capacity). This may be true even for failover events, as many and potentially most such events would not be of a magnitude that the PSE 150 is designed to withstand. For example, most failover events may be handled by replication of a few gigabytes of data, representing a small portion of the total reserved capacity of a PSE 150.

As disclosed herein, embodiments of the present disclosure improve operation of a PSE 150 by providing for use of reserved capacity (which may otherwise remain unused, except or even during failover events) as a storage cache. Specifically, as disclosed herein, the reserved capacity data cache 170 may be implemented within reserved capacity of the PSE 150 (as reserved for a primary purpose, such as failover replication) and used to store data used or expected to be used at the PSE 150. In one example, the reserved capacity data cache 170 is used to store snapshots from the PSE bucket 110, which snapshots may represent machine images facilitating generation of VMs 166. For example, a snapshot may contain a point-in-time representation of a volume 168 including code executable to implement a VM 166, such as an operating system, applications, configurations, libraries, utilities, and the like. Such snapshots may be used at the PSE 150 to generate VMs 166 providing desired functionality, or to re-initialize existing VMs 166 to a state reflected in the snapshot. In some instances, snapshots may be re-used multiple times at a PSE 150, such as to repeatedly re-initialize a VM 166 to a given state. Because retrieval of a snapshot from the cloud provider network substrate 100 may require significant time and network resources, it thus be desirable to avoid repeated retrieval of the snapshot from the cloud provider network substrate 100. In accordance with embodiments of the present disclosure, a snapshot (e.g., retrieved from the PSE bucket 110) may thus be stored at the reserved capacity data cache 170, such that requests for the snapshot can be serviced from the cache 170 rather than via interaction with the substrate 100. In one embodiment, caching occurs on a first use of the snapshot, such that subsequent use of the snapshot can occur via locally stored data. In another embodiment, caching occurs prior to a first use of the snapshot, by pre-loading the snapshot in the cache 170 on the basis of expected future use. The PSE 150 may be configured such that requests for a snapshot are routed to either the local reserved capacity data cache 170 or the substrate 100, as appropriate. For example, the PSE servers 152 or another component (e.g., the object gateway 156) may be configured to intercept requests for a snapshot and service the request from data in the cache 170, if the requested data exists in the cache 170, or from the substrate 100 otherwise. In this manner, snapshots may be more rapidly accessed at the PSE 150, speeding operation of the PSE 150 and improving efficiency.

While embodiments of the present disclosure are described with reference to snapshots, the reserved capacity data cache 170 may be utilized to store any variety of data used at the PSE 150. Moreover, while embodiments are described with reference to snapshot data generally, these embodiments should be understood—unless stated otherwise—to encompass all or a portion of snapshot data. For example, a request to read a snapshot may correspond to a request to read a particular portion of the snapshot, such as one or more blocks of the snapshot. Thus, embodiments as described herein may be used to speed operation of a PSE 150 with respect to complete data objects or portions thereof.

To ensure security and data privacy, data cached within reserved capacity may be encrypted. For example, data may be encrypted at rest using encryption under the advanced encryption standard (AES), such as 256-bit AES (AES-256). Moreover, data may be encrypted during transmission, such as by use of transport layer security (TLS) to encrypt communications to and from devices accessing cached data. Moreover, data privacy and security may be ensured by appropriate authentication and authorization checks. Illustratively, requests to access data within the reserved capacity data cache 170 may require that a requesting device first authenticate with the PSE 150 (e.g., by providing appropriate authentication credentials to control plane components 164). Moreover, the PSE 150 (e.g., via control plane components 164) may be configured to ensure that such authenticated party has sufficient authorization to access requested data, such as by verifying authorization with an Identity and Access Management (IAM) policy associated with the data.

In some embodiments, authentication and/or authorization may additionally or alternatively occur between a requesting device and the cloud provider network substrate 100. For example, the PSE 150 may require that a requesting device authenticate with control servers 112 to obtain an authorization token that is provided to the PSE servers 152 with a request to access cached content. Accordingly, the reserved capacity data cache 170 may be implemented in a secure manner.

Figure 2A:
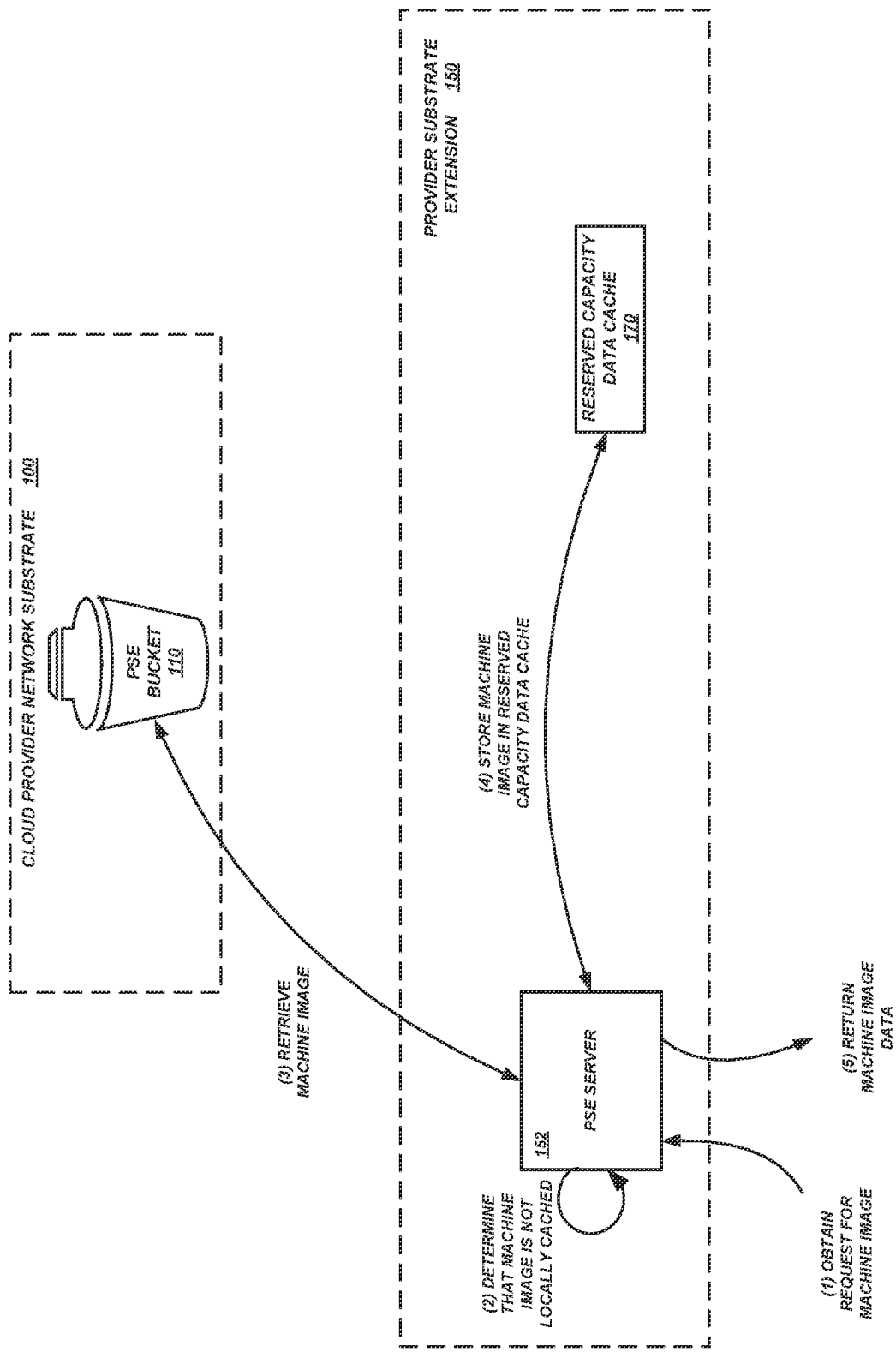
FIGS. 2A-2B depict illustrative interactions for utilization of a reserved capacity data cache within a provider substrate extension of FIG. 1 to speed requests for data at the provider substrate extension.
Figure 2B:
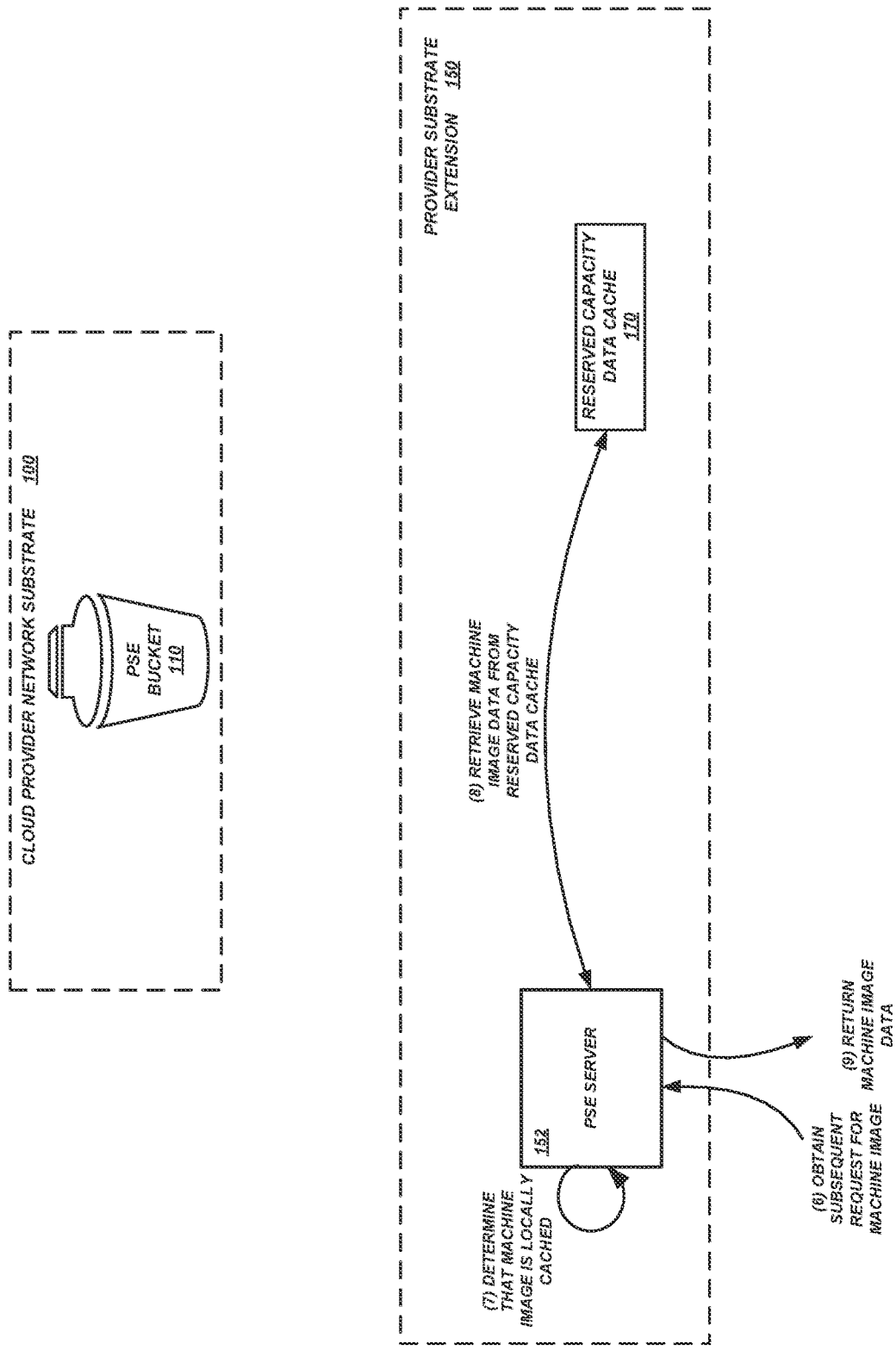

With reference to FIGS. 2A-2B, illustrative interactions will be described for utilization of a reserved capacity data cache 170 within a PSE 150 to speed requests for data at the PSE 150. Specifically, the interactions of FIG. 2A reflect illustrative interactions for serving a request for data by retrieval of the data from a cloud provider network substrate 100, while the interactions of FIG. 2B reflect illustrative interactions for serving a subsequent request for data by retrieval of the data from the reserved capacity data cache 170.

The interactions of FIG. 2A begins at (1), where the PSE server 152 obtains a request for a machine image, which may illustratively contain code executable to implement a virtual machine instance. Illustratively, the request may correspond to a request to launch a new instance from the machine image. Alternatively, the request may correspond to a request to pre-cache a machine image for subsequent use. While shown as originating externally to the PSE server 152, the PSE server 152 may in some embodiments originate the request.

In some instances, the request may be a request to retrieve the full machine image. In other instances, the request may be a request to retrieve a part of the machine image, such as a read request for one or more designated portions (e.g., blocks) of the image. For example, the PSE server 152 may be configured as a read endpoint for a machine image that does not differentiate between local and remote storage of the image (e.g., by providing for reading of the image via local storage protocol, regardless of whether the image is stored at the PSE 150). The PSE server 152 may accept reads to specific portions of the image, and interpret such reads as a request for that portion, serving them as described in FIG. 2A-2B.

At (2), the PSE server 152 determines that the requested machine image is not locally cached within the reserved capacity data cache 170. Illustratively, the PSE server 152 may inspect the cache 170 to make such a determination, or may maintain a list of objects stored the cache 170 and make the determine by inspection of such a list.

At (3), because the requested image is not stored within the cache 170, the PSE server 152 retrieves the machine image from the cloud provider network substrate 100 (e.g., from the PSE bucket 110). While not shown in FIG. 2, retrieval with the cloud provider network substrate 100 may illustratively occur via an object gateway 156 as discussed above.

Thereafter, at (4), the PSE server 152 stores the machine image in the reserved capacity data cache 170. As noted above, the cache 170 may utilize reserved storage capacity of the PSE 150, and thus be otherwise unused. The PSE server 152 can then, at (5), service the request by returning data of the machine image (e.g., the full machine image or portion requested). While shown as returned from the server 152, in some instances the server 152 may facilitate return directly from the cache 170, such as by returning in response to the request a pointer to the data as stored in the cache 170. Moreover, where the request originates at the server 152, the server 152 may service the request by retrieval of machine image data from the cache 170.

While data return in FIG. 2A may be delayed by the time required to retrieve the requested data from the substrate 100, subsequent requests for data of the machine image (e.g., the requested data or other data of the machine image, where the requested data is less than the entire machine image) may be accelerated by servicing of the request from the cache 170, as described with reference to FIG. 2B. Specifically, as shown in FIG. 2B, the PSE server 152 may, at (6), obtain a subsequent request for data of the machine image. At (7), the server 152 can determine that the machine image (or relevant portion thereof) is cached within the reserved capacity data cache 170 (e.g., via the interactions of FIG. 2A). As noted above, the determination may occur, for example, by inspection of the cache 170, by inspection of a list of data stored within the cache 170 (e.g., as updated when the data is stored within the cache 170), or the like. Because the machine image is stored within the cache 170, the PSE server 152 at (8) retrieves the relevant machine image data from the cache 170, and can then service the request by returning the data at (9). Because the interactions of FIG. 2B do not require interaction with the cloud provider network substrate 100, these interactions may occur more quickly than those of FIG. 2A. Moreover, because these interactions utilize what may be otherwise unused capacity of the extension 150, these improves incur little or no additional cost in terms of resources of the substrate 150.

Figure 3:
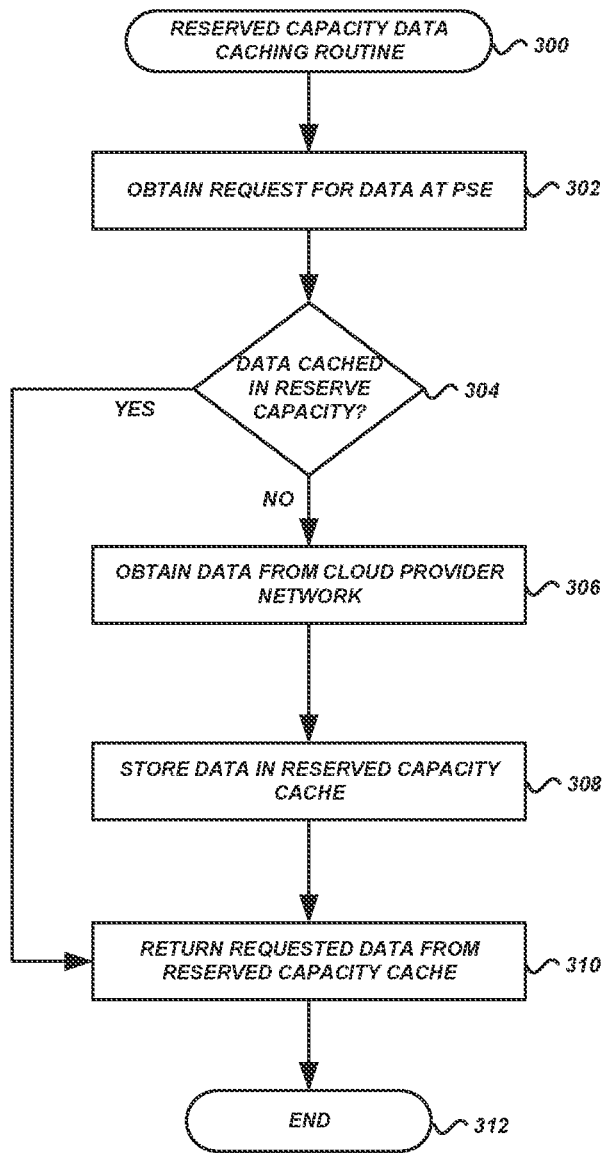
FIG. 3 depicts an illustrative routine for caching data within a reserved capacity data cache of a provider substrate extension of FIG. 1.
Figure 4:
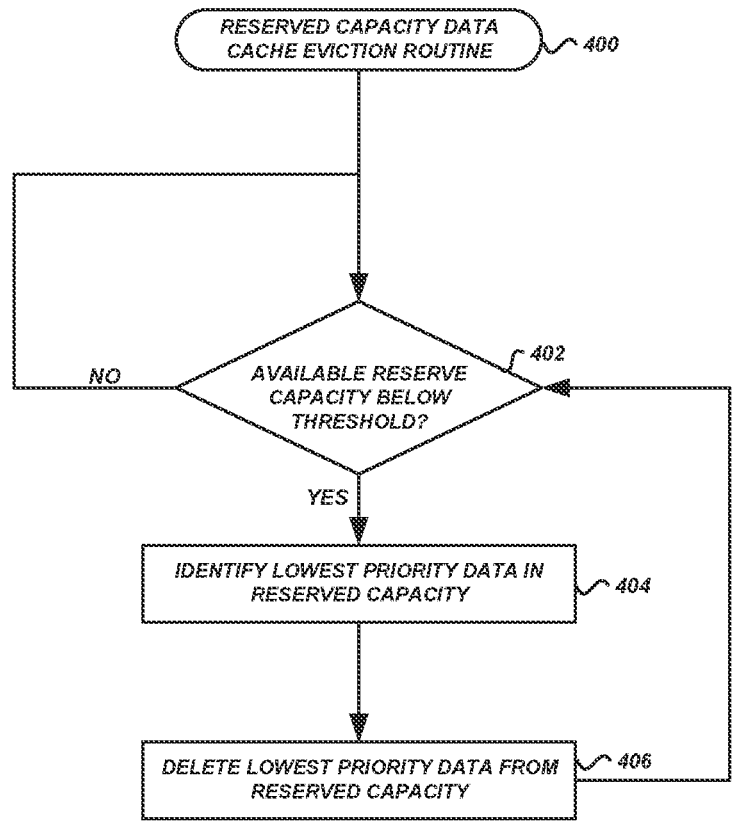
FIG. 4 depicts an illustrative routine for evicting data within the reserved capacity data cache of a provider substrate extension of FIG. 1.

With reference to FIGS. 3 and 4, illustrative routines will be described for implementing aspects of the present disclosure. Specifically, FIG. 3 depicts an illustrative routine 300 for caching data within a reserved capacity data cache. FIG. 4 depicts an illustrative routine 400 for evicting data within the reserved capacity data cache, such as in response to a reduction in available reserved capacity during a failover event. The routines 300 and 400 are illustratively implemented by the PSE 150, such as by the PSE servers 152.

As shown in FIG. 3, the routine 300 begins at block 302, where the PSE 150 obtains a request for data at the PSE 150. The request may be obtained, for example, from a customer device 160 or a PSE server 152. As noted above, to ensure data privacy and security the request may include authentication and/or authorization information enabling the PSE server 152 to verify that the request is permitted to access the data. Moreover, the request (and other communications of FIG. 3) may occur via secure communication channels, such as TLS-encrypted channels. In one embodiment, the request is to obtain a particular data object, such as a machine image or snapshot providing a point-in-time representation of a volume 168 or VM 166. Such a request may be associated with a current use of the data object, such as a request to generate a VM 166 based on a data object. Such a request may alternatively be associated with a future use of the data object. For example, an end user may request that a specific volume 168 be accelerated or rapidly restorable from a snapshot, which may generate a request for the snapshot corresponding to the volume. In another embodiment, the request is to read a portion of a data object. For example, the request may be to read one or more data blocks of a block storage device. Illustratively, the PSE 150 may be configured to present a particular data object (e.g., a machine image) as a local storage device, regardless of whether the machine image is actually stored on the PSE 150, and may be configured to handle reads to the local storage device via the routine 300.

At block 304, the PSE 150 determines whether the requested data is locally cached on the PSE 150 within a reserved capacity data cache 170. As discussed above, the reserved capacity data cache 170 may be generated within reserved capacity of persistent storage of the PSE 150, which may be reserved for example to support failover operations on the PSE 150 (e.g., wherein the PSE 150 is configured to respond to a failure of all or a part of an in-use portion of persistent storage by replicating data within the in-use portion, such as data of a volume 168, to the reserved portion of the persistent storage). In one embodiment, the PSE 150 determines whether the requested data is cached within the reserved capacity data cache 170 by inspection of the reserved capacity data cache 170. In another embodiment, the PSE 150 maintains a list of data stored within the reserved capacity data cache 170, and detects whether requested data is stored within the reserved capacity data cache 170 by reference to the list. Illustratively, each portion of data stored within the reserved capacity data cache 170 may be associated with a unique identifier, such as a hash value derived from passing the portion of data through a hashing algorithm. Read requests may identify data by this unique identifier, or the PSE 150 may maintain information mapping read portions to unique identifiers. For example, where read requests identify data my block of a data storage volume, the PSE 150 may maintain a manifest mapping specific block locations of the volume to particular identifiers of data objects storing the blocks of those locations. Thus, the PSE 150 may detect whether a requested portion of data is stored within the reserved capacity data cache 170 by determining a data object identifier corresponding to the read request and determining whether a data object with the data object identifier is stored within the cache 170.

If block 304 evaluates as true, the routine 300 proceeds to block 310, where the requested data is returned from the reserved capacity data cache 170. Illustratively, the PSE 150 may read the data from the data cache 170 and provide the data in response to the read request. Alternatively, the PSE 150 may provide the data by returning a location of the data within the data cache 170, enabling a requesting device to read the data from the data cache 170.

If block 304 evaluates as false, the routine 300 proceeds to block 306, where the PSE 150 obtains the data from a cloud provider (e.g., from the PSE bucket 110 via an object gateway 156). In one embodiment, the PSE 150 reads only the data requested. In another embodiment, the PSE 150 reads other data associated with the requested data. For example, a request to read one or more blocks of a machine image may cause the PSE 150 to retrieve the entire machine image at block 306. Such retrieval may illustratively prioritize the requested data over other data, such that the requested data can be returned more quickly (e.g., before a remainder of the image is retrieved).

Thereafter, at block 308, the obtained data is stored within the reserved capacity data cache 170, and returned in response to the request at block 310 as described above. Because the data has been stored within the cache 170, subsequent requests to read the data may be serviced from the cache 170, thus speeding operation of the routine 300. For example, implementation of the routine 300 when block 304 evaluates to true (e.g., on a subsequent request for the data stored within the cache 170) may require significantly less time and fewer resources than implementation of the routine 300 when block 304 evaluates as false, such as due to resource constraints in implementing block 306. As noted above, the data is illustratively stored within the cache 170 as read-only data, to avoid loss of data should the data be evicted (deleted) from the cache 170. The routine 300 then ends at block 312.

The routine 300 may be modified in various embodiments of the present disclosure. For example, while the routine 300 is described above as returning requested data from a reserved capacity data cache 170, there may be instances in which requested data is returned from the cloud provider network without use of the reserved capacity data cache 170. For example, where the size of the reserved capacity data cache 170 is insufficient to store requested data (such as when failover events have used all reserved capacity, setting the size of the reserved capacity data cache 170 to zero, or such as when all data within the reserved capacity data cache 170 has a higher priority than the read data), the routine 300 may be modified to return the requested data directly from the cloud provider network, without use of the reserved capacity data cache 170. This may be referred to as a "read through" mode. Thus, description of the routine 300 should be understood to be illustrative.

With reference to FIG. 4, an illustrative routine 400 will be described for evicting data within the reserved capacity data cache, such as in response to a reduction in available reserved capacity during a failover event. As noted above, the routine 400 is illustratively implemented by the PSE 150.

The routine 400 begins at block 402, where the PSE 150 determines whether an available capacity of a reserved storage cache 170 at the PSE 150 is below a threshold level, where available capacity refers to a portion of the reserved storage cache 170 not storing cached data. The threshold may be set, for example, by an administrator of the PSE 150, such as a cloud provider. The threshold may be an absolute value, such as n terabytes, gigabytes, etc., or a relative value, such as a given percentage (e.g., 5%, 10%, 15%, etc.) of total reserved storage capacity. The available capacity of the reserved storage cache 170 may vary due to various operations of the PSE 150. For example, caching of data within the reserved storage cache 170 may reduce an available capacity of the reserved storage cache 170. Additionally, the PSE 150 may reduce an absolute size of the reserved storage cache 170 during failover operations, when at least a portion of reserved storage capacity of the PSE 150 may become "in-use" to support continued resilient operation of the PSE 150. This reduction in absolute size of the reserved storage cache 170 may, in turn, cause the available capacity of the reserved storage cache 170 to fall below the threshold level.

If block 402 evaluates as false, the routine 400 returns to block 402 until such time as that block evaluates as true. For example, the routine 400 may be implemented as a continuous loop during operation of the PSE 150, with block 402 being evaluated continuously or periodically (e.g., every n seconds, clock cycles, etc.).

If block 402 evaluates as true, the routine 400 proceeds to block 404, where the PSE 150 identifies a lowest priority data object in the reserved capacity data cache 170. Any variety of selection mechanisms may be used to identify a lowest priority data object. For example, the PSE 150 may impose a "least recently used" eviction policy, such that a least recently read data object of the cache 170 is selected as a lowest priority data object. As another example, the PSE 150 may utilize importance indicators associated with data objects (e.g., manually by an end user) and select a least important data object for eviction. As yet another example, the PSE 150 may prioritize data for caching based on factors such as size, frequency of alterations, or up-to-dateness. Illustratively, the PSE 150 may assign larger data a lower priority for caching than smaller data, less frequently altered data a higher priority for caching than more frequently altered data, more up-to-date data (e.g., corresponding to a latest version number) higher priority than less up-to-date data, etc. Various other example, such as "least frequent use" are also possible, along with combinations of these examples (e.g., combining two or more of recency, frequency, and importance, such as via weight linear combination).

Thereafter, at block 406, the PSE 150 deletes (evicts) the lowest priority data from the reserved capacity data cache 170. The routine 400 then returns to block 402, as noted above. If deletion did not bring the available capacity below the threshold level, the routine 400 may continue to evict additional data until the threshold level is reached. Thus, implementation of the routine 400 can facilitate maintaining availability of the reserved capacity data cache 170 at above the threshold level.

Notably, the routine 400 may be implemented concurrently with other functionality of the PSE 150. For example, as discussed above, the PSE 150 may be configured to respond to failure of an in-use portion of a data store, such as a failure of a replica of a data volume 168, by implementing a failover operation that utilizes or allocates reserved capacity (otherwise used for the reserved capacity data cache 170) to create a new replica of the volume 168. This failover operation may reduce the reserved capacity data cache 170, thus shrinking available reserve capacity below a threshold level and causing one or more data items to be deleted from the cache 170, as described above. Accordingly, implementation of the routine 400 can enable a PSE 150 to implement a reserved capacity data cache 170 without inhibiting primary use of reserved storage capacity. Somewhat similarly, an increase in reserved capacity (such as installing a new physical drive to the PSE 150) may correspondingly increase available reserved capacity, enabling more data to be stored in the reserved capacity data cache 170 prior to evictions.

Figure 5:
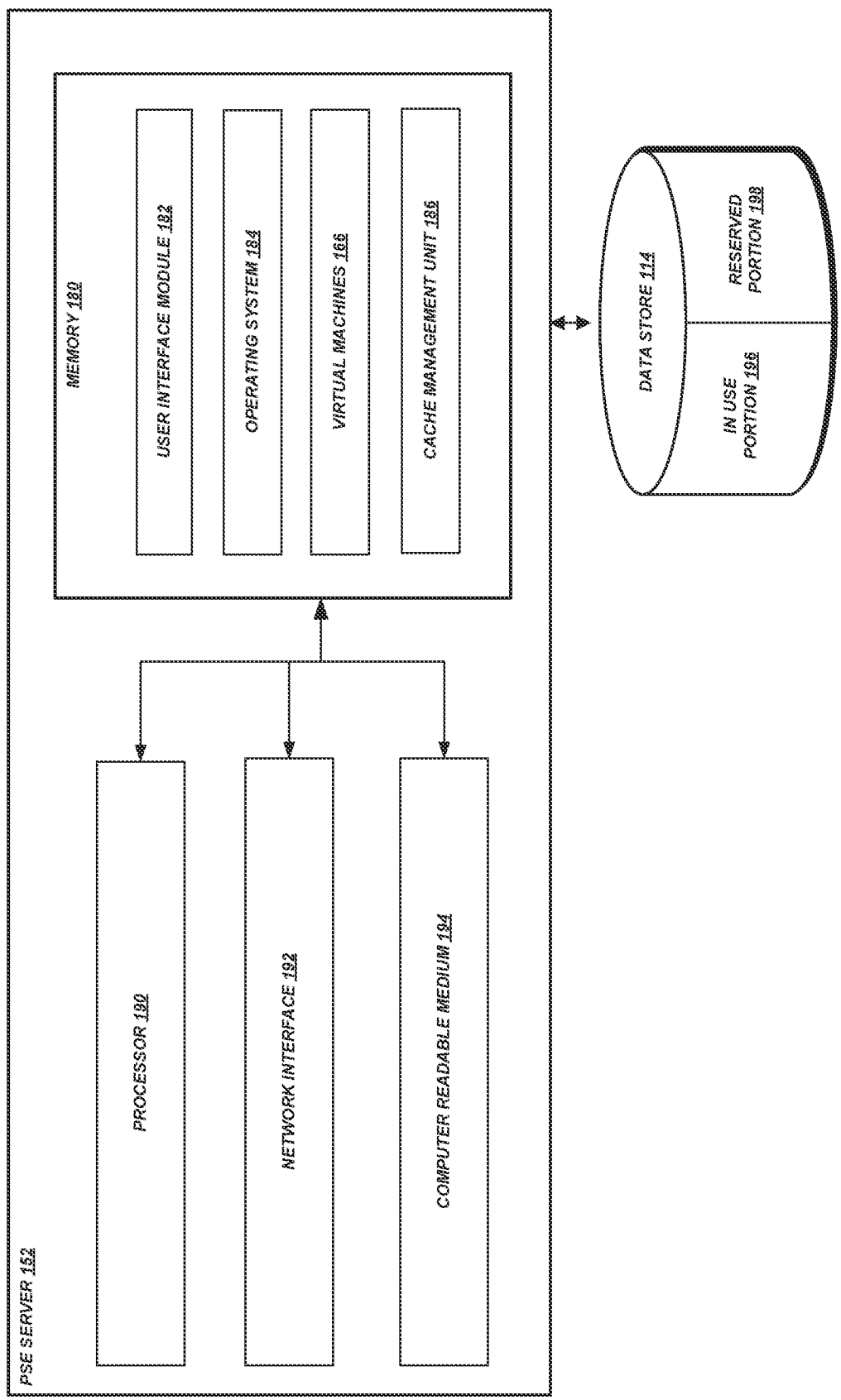
FIG. 5 depicts an example architecture of a computing system that can be used to perform one or more of the techniques described herein or illustrated in FIGS. 1-4.

FIG. 5 depicts an example architecture of a computing system (referred to as the PSE server 152) that can be used to perform one or more of the techniques described herein or illustrated in FIGS. 1-4. The general architecture of the PSE server 152 depicted in FIG. 5 includes an arrangement of computer hardware and software modules that may be used to implement one or more aspects of the present disclosure. The PSE server 152 may include many more (or fewer) elements than those shown in FIG. 5. It is not necessary, however, that all of these elements be shown in order to provide an enabling disclosure. As illustrated, the PSE server 152 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via a network (e.g., connecting the PSE 150 and the cloud provider network substrate 100).

The PSE server 152 further includes or is in communication with a data store 114, representing any variety of hardware providing persistent (or substantially persistent) storage, such as HDDs, SSDs, or the like and combinations thereof. As shown in FIG. 5, the data store 114 includes both an in-use portion 196, used to store for example data for VMs 166 and volumes 168, and a reserved portion 198 that is reserved for failover operation of the in-use portion 196.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the PSE server 152. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 includes VMs 166, which may implement functionality associated with a cloud provide network, and a cache management unit 186. In one embodiment, the cache management unit 186 when executed implements various aspects of the present disclosure, e.g., maintaining a reserved capacity data cache 170 within the reserved portion 198 of the data store 114, caching data objects within the reserved capacity data cache 170, serving requests to read data objects from the reserved capacity data cache 170 if such objects are cached, evicting objects from the reserved capacity data cache 170, and/or other aspects discussed herein or illustrated in FIGS. 1-4.

While the cache management unit 186 is shown in FIG. 5 part of the PSE server 152, in other embodiments, all or a portion of the cache management unit 186 may be implemented by another computing device. For example, in certain embodiments of the present disclosure, another computing device in communication the PSE server 152 (e.g., a local network manager 154, an object gateway 156, etc.) may include several modules or components that operate similarly to the modules and components illustrated as part of the PSE server 152. In some instances, the cache management unit 186 may be implemented as one or more virtualized computing devices. Moreover, the cache management unit 186 may be implemented in whole or part as a distributed computing system including a collection of devices that collectively implement the functions discussed herein.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might." "may." "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A cloud provider network extension system that is remote from a cloud provider network and facilitates interaction with the cloud provider network, the cloud provider network extension system comprising:
one or more data stores comprising:
an in-use portion storing a data volume, the data volume corresponding to persistent storage of a virtual machine instance that implements functionality associated with the cloud provider network; and
a reserved portion reserved for failover operation related to the data volume during failure of some or all of the in-use portion; and
one or more processors configured to:
retrieve at least one portion of a machine image from the cloud provider network, the machine image representing a point-in-time representation of the data volume;
cache the at least one portion of the machine image in the reserved portion of the one or more data stores;
obtain a request to read from the machine image representing the point-in-time representation of the data volume;
respond to the request by providing the at least one portion of the machine image from the reserved portion of the one or more data stores;

detect at least partial failure of the in-use portion of the one or more data stores, the at least partial failure corresponding to a failure to store at least one portion of the data volume; and responsive to the at least partial failure of the in-use portion of the one or more data stores:
- delete the at least one portion of the machine image in the reserved portion; and
- replicate the at least one portion of the data volume to the reserved portion as a failover operation.

2. The cloud provider network extension system of claim 1, wherein the one or more processors are further configured to select the at least one portion of the machine image in the reserved portion for deletion based on detecting that an available capacity of the reserved portion has fallen below a threshold level.

3. The cloud provider network extension system of claim 1, wherein the one or more processors are further configured to select the at least one portion of the machine image in the reserved portion for deletion based on application of a cache eviction algorithm to the reserved portion.

4. The cloud provider network extension system of claim 3, wherein the cache eviction algorithm selects the at least one portion of the machine image as a least recently used data object within the reserved portion.

5. A method implemented at a cloud provider network extension system that is remote from a cloud provider network and facilitates interaction with the cloud provider network, the cloud provider network extension system including one or more data stores comprising an in-use portion storing a data used to implement functionality associated with the cloud provider network and a reserved portion reserved for failover operation related to the data during failure of some or all of the in-use portion, the method comprising, by at least one processor of the cloud provider network extension system:
- retrieving a data object from the cloud provider network;
- caching the data object in the reserved portion of the one or more data stores;
- obtaining a request to read the data object;
- responding to the request by providing the data object from the reserved portion of the one or more data stores;
- detecting at least partial failure of the in-use portion of the one or more data stores, the at least partial failure corresponding to a failure to the data used to implement functionality associated with the cloud provider network; and
- responsive to the at least partial failure of the in-use portion of the one or more data stores:
  - evicting the data object from the reserved portion; and
  - reallocating at least part of the reserved portion for replication of the data used to implement functionality associated with the cloud provider network as a failover operation.

6. The method of claim 5, wherein caching the data object in the reserved portion of the one or more data stores comprises storing data object in the reserved portion as a read-only data object.

7. The method of claim 5 further comprising, prior to caching the data object in the reserved portion of the one or more data stores, detecting that an available capacity of the reserved portion is sufficient to store the data object.

8. The method of claim 5, wherein the data object is at least one portion of a snapshot of data volume of a virtual machine instance.

9. The method of claim 8 wherein the request to read the data object is a request to read one or more blocks of the snapshot, and wherein the method further comprises:
- obtaining a manifest mapping blocks of the snapshot to data objects; and
- determining that the data object cached in the reserved portion of the one or more data stores is mapped to the one or more blocks of the snapshot within the manifest.

10. The method of claim 9, wherein data objects are identified within the manifest using hash values.

11. The method of claim 5, wherein the data object is a first portion of a snapshot of data volume of a virtual machine instance, the method further comprising:
- obtaining a request to read from a second portion of the snapshot;
- detecting that the second portion of the snapshot is not cached within the reserved portion of the one or more data stores; and
- responsive to detecting that the second portion of the snapshot is not cached within the reserved portion of the one or more data stores:
  - retrieving the second portion of the snapshot from the cloud provider network; and
  - returning the second portion of the snapshot in response to the request to read from the second portion of the snapshot.

12. The method of claim 11 further comprising caching the second portion of the snapshot in the reserved portion.

13. The method of claim 5, wherein retrieving the data object from the cloud provider network is responsive to the request to read the data object.

14. One or more non-transitory computer-readable media comprising instructions executable by at least one processor of a cloud provider network extension system that is remote from a cloud provider network and facilitates interaction with the cloud provider network, the cloud provider network extension system including one or more data stores comprising an in-use portion storing a data used to implement functionality associated with the cloud provider network and a reserved portion reserved for failover operation related to the data during failure of some or all of the in-use portion, wherein the instructions, when executed by the at least one processor, cause the cloud provider network extension system to:
- retrieve a data object from the cloud provider network;
- cache the data object in the reserved portion of the one or more data stores;
- obtain a request to read from the data object;
- respond to the request by providing the data object from the reserved portion of the one or more data stores;
- detect at least partial failure of the in-use portion of the one or more data stores, the at least partial failure corresponding to a failure to store the data used to implement functionality associated with the cloud provider network; and
- responsive to the at least partial failure of the in-use portion of the one or more data stores:
  - delete the data object in the reserved portion; and
  - replicate the data used to implement functionality associated with the cloud provider network to the reserved portion as a failover operation.

15. The one or more non-transitory computer-readable media of claim 14, wherein caching the data object in the reserved portion of the one or more data stores comprises storing the data object in the reserved portion as a read-only data object.

16. The one or more non-transitory computer-readable media of claim 14, wherein the instructions, when executed by the at least one processor, further cause the cloud provider network extension system to, prior to caching the data object in the reserved portion of the one or more data stores, detecting that an available capacity of the reserved portion is sufficient to store the data object.

17. The one or more non-transitory computer-readable media of claim 14, wherein the data object is a machine image representing a snapshot of data volume of a virtual machine instance.

18. The one or more non-transitory computer-readable media of claim 17, wherein the data used to implement functionality associated with the cloud provider network includes the data volume.

19. The one or more non-transitory computer-readable media of claim 14, wherein the instructions, when executed by the at least one processor, further cause the cloud provider network extension system to:
- obtain a request to read a second data object;
- detect that the second data object is not cached within the reserved portion of the one or more data stores; and
- responsive to detecting that the second data object is not cached within the reserved portion of the one or more data stores:
  - retrieve the second data object from the cloud provider network; and
  - return the second data object in response to the request to read the second data object.

\* \* \* \* \*